May 27, 1969
J. H. ENICKS
3,446,880
METHOD OF MANUFACTURING A PROTECTIVE ATHLETIC PAD
Filed Dec. 31, 1964
Sheet 1 of 3
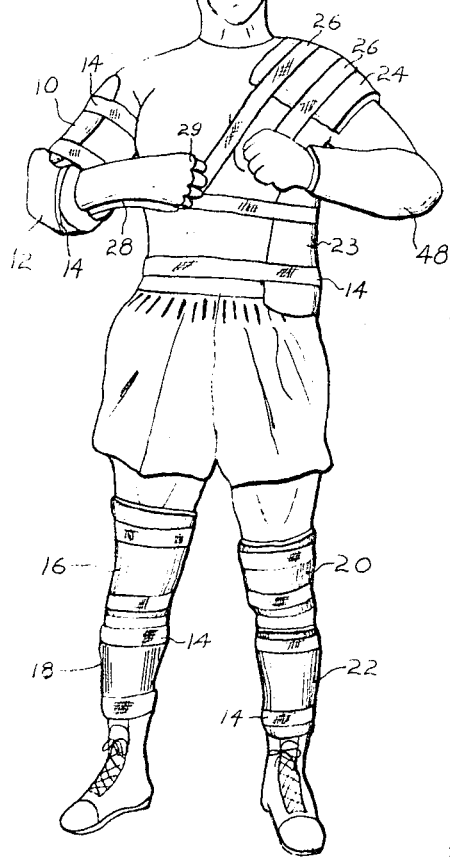
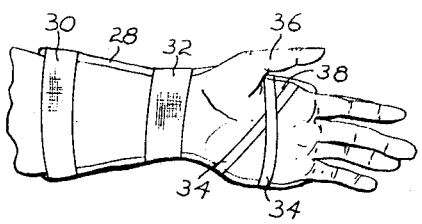
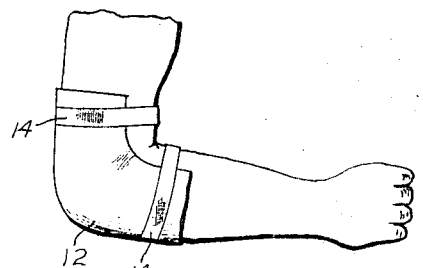
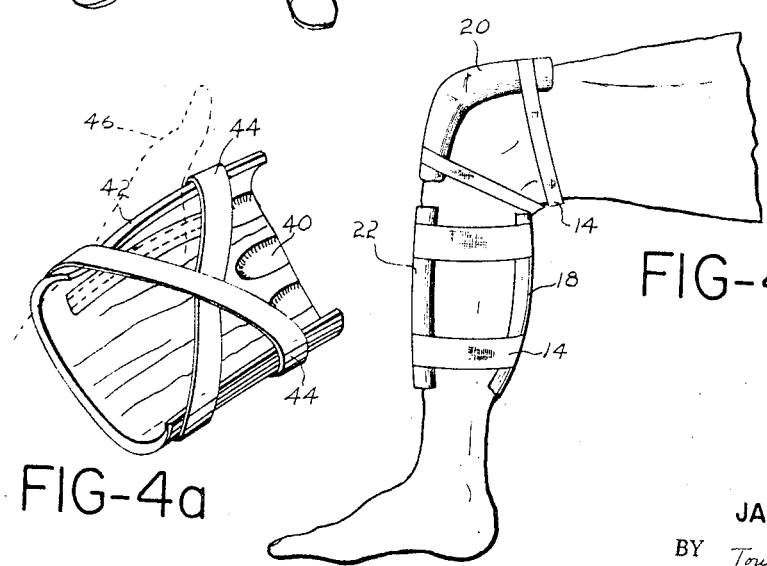
INVENTOR.
JAMES H. ENICKS
BY Toulmin & Toulmin
ATTORNEYS May 27, 1969     J. H. ENICKS     3,446,880

METHOD OF MANUFACTURING A PROTECTIVE ATHLETIC PAD

Filed Dec. 31, 1964

1. APPLYING A THIN LAYER OF PLASTISOL SKIN TO THE MOLD.

2. HEATING THE MOLD AND SKIN.

3. POURING IN PLASTISOL WITH BLOWING AGENT FOR FORMING EXPANDED MEMBER.

4. HEATING FOR PARTIAL BLOWING OF EXPANDED MEMBER AND PARTIAL FUSION OF SKIN THERETO.

INVENTOR.
JAMES H. ENICKS

BY *Toulmin & Toulmin*

ATTORNEYS

May 27, 1969  J. H. ENICKS  3,446,880
METHOD OF MANUFACTURING A PROTECTIVE ATHLETIC PAD
Filed Dec. 31, 1964  Sheet 3 of 3

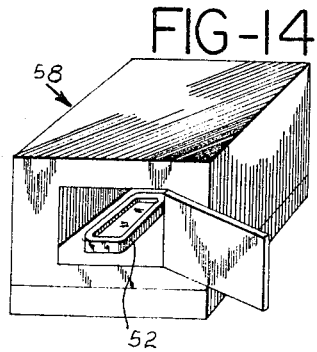

FIG-14

5. APPLYING REINFORCING STRIPS WHERE NECESSARY AND APPLYING SKIN LAYER OVER PARTIALLY EXPANDED MEMBER.

6. HEATING TO COMPLETE BLOWING OF EXPANDED MEMBER AND FUSING SKIN THERETO.

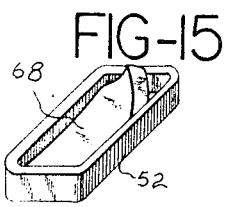

FIG-15

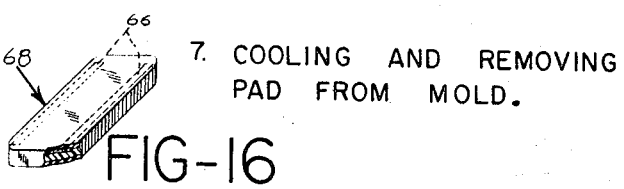

FIG-16

7. COOLING AND REMOVING PAD FROM MOLD.

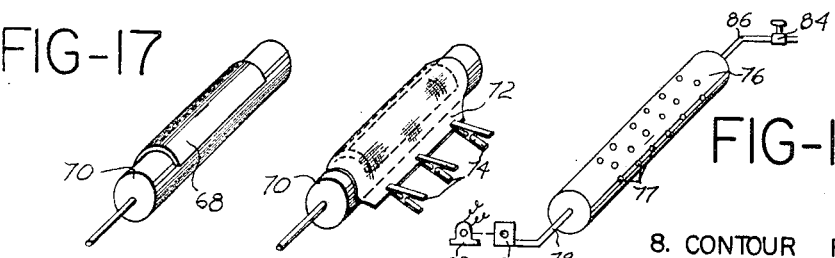

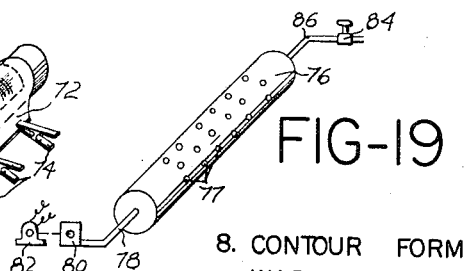

FIG-19

8. CONTOUR FORMING A WARMED PAD OVER A MOLD.

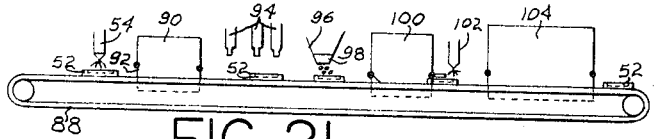

FIG-21

9. COMPLETED FOREARM AND ELBOW PAD.

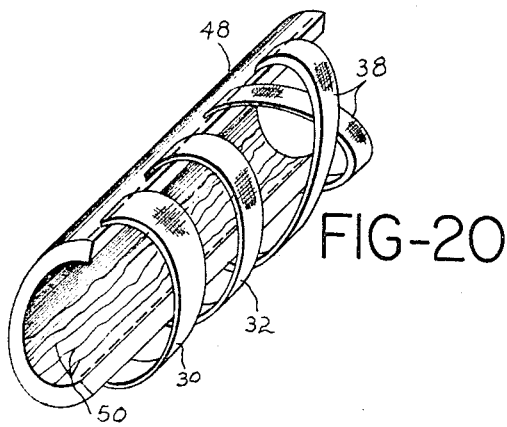

FIG-20

INVENTOR.
JAMES H. ENICKS
BY Toulmin & Toulmin
ATTORNEYS

United States Patent Office 3,446,880
Patented May 27, 1969

3,446,880
METHOD OF MANUFACTURING A PROTECTIVE ATHLETIC PAD
James H. Enicks, 303 Ridgeview Drive, Greenville, Ohio 45331
Filed Dec. 31, 1964, Ser. No. 422,788
Int. Cl. B29d 27/06
U.S. Cl. 264—45                  3 Claims This invention relates to a method of making padding for providing the human body with protection, and is particularly concerned with padding used in sporting activities such as football, basketball, soccer, etc., wherein the players are susceptible to frequent body contact.

Some of the prior art pads have been fabricated from combinations of leather, cloth, fabrics, plastic, etc. which have been reinforced with relatively rigid materials. These have proved to be cumbersome, expensive, subject to rotting or decaying from the perspiration of the wearer and generally unsatisfactory.

Some of the prior art pads have also been covered with protective layers to guard against perspiration; however, the layers soon peeled away from the base of the pad as a result of deterioration by the perspiration or as a result of peeling by the use of adhesive tapes which are frequently used to secure the pads in position.

The pads made according to this invention are made from plastisols which are dispersions of polyvinyl chloride resins in suitable liquid plasticizers.

A suitable mold for the particular pad being made is covered with a thin layer of plastisol skin with no blowing agent therein. After suitable heating and cooling, a designated amount of the plastisol with a blowing agent therein is placed in the mold over the skin therein and the mold with the contents therein is placed in an oven for suitable heating. The plastisol with the blowing agent therein comprises the main cushioning member for the pad. After the mold is removed from the oven, reinforcing means may be positioned on top of the cushioning member now partially formed, and an additional layer of plastisol skin with no blowing agent therein is applied thereover. The mold with the contents therein is again placed in an oven and heated to complete the fusing and blowing of the cushioning member and is subsequently removed and cooled.

The pad as produced from the above process has the cushioned layer sandwiched between skin layers which are integrally joined thereto and which pad provides excellent shock absorbing properties with a skin that lends itself readily to taping without peeling upon subsequent removal of the tape. With the reinforcement means in the pad, securing straps can be secured thereto to enable the pad to be secured to the wearer.

After the pads are removed from the above mold which may be generally planar in nature, the pad may be placed around another pattern such as a human hand and heated to mould the generally planar pad in a contoured pad which will fit the wrist and forearm, for example. It is understood, of course, that the specific shape of the pad will be dictated by its intended use and while mention is here made of using the pad in connection with sporting activities, it is also possible to use the pad and method of making the same for medical or orthopedic applications.

Accordingly, a primary object of this invention is to produce a protective pad for use in sporting activities such as football, which pad is light in weight, economical, and affords the user excellent protection from extreme physical blows.

A further object of this invention is to manufacture a pad which is readily secured to the wearer, and which pad has a skin which is resistant to the deleterious effects of perspiration and which will not peel from the cushioning member in the pad.

Another object of this invention is to produce a basic pad structure which can be fitted to any part of the human body and which may have suitable reinforcing means therein for securing the pad on the wearer.

A further object of this invention is to produce an economical method for producing the pads of this invention.

A still further object of this invention is to produce a method of contour shaping the pads of this invention.

These and other objects and advantages of this invention will be understood more readily in connection with the following specification and drawings in which:

FIGURE 1 is a view of a man wearing the different forms of this invention which the protective pad may take;

FIGURE 2 is a view of the hand and wrist pad shown in FIGURE 1;

FIGURE 3 is a side view of an elbow pad on the wearer;

FIGURE 4 is a side view of knee, leg calf and shin pads;

FIGURE 4a is a perspective view of a wrist and knuckle pad;

FIGURE 14 shows heating of the mold and contents shown in FIGURE 13;

FIGURE 15 shows the pad being removed from the mold;

FIGURE 16 shows a perspective view of the pad in planar form which will be developed into the molded contour forearm pad shown in FIGURE 20;

FIGURE 17 is a perspective view of a forearm pad positioned on a forming mandrel;

FIGURE 18 is a perspective view of the means for securing the pad to the form while the contoured shape is set;

FIGURE 19 is a perspective view of vacuum operated means for securing the pad to the form while the contoured shape is set;

FIGURE 20 shows the finished forearm pad with the means for securing it to the forearm of the wearer; and FIGURE 21 is a generally schematic view showing how the process may be made continuous on a conveyorized system.

Figure 5:
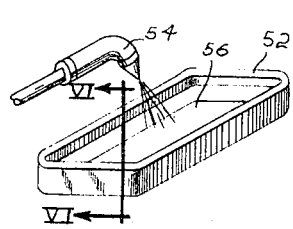
FIGURE 5 shows the first step of the method in which the plastisol skin is applied to the mold.

Referring to the drawings in more detail, FIGURE 1 shows a man wearing the different forms of the invention which the protective pad may take. They include an upper arm pad 10 and an elbow cup pad 12, each of which is secured to the user by knit elastic straps 14 of known variety. The straps 14 are circumferential in nature and are applied as one would apply garters.

Other pads shown are knee pad 16 which also covers a portion of the thigh, leg calf pad 18, knee cup 20, shin pad 22, and side pad 23. Each of these pads is secured in place by the elastic straps 14, although they may also be taped in position.

FIGURE 1 also shows a shoulder pad 24 which may be taped in position by adhesive tapes 26 as shown. The tape may be secured to the body of the wearer or on to a garment as shown.

Each of the pads is free of sharp edges and is made of a plastisol which has a skin integrally fused to the foamed structure between the skins. The pads may be flesh colored and are extremely flexible and lightweight, and the method of making the pads will be later discussed. Although the skin of the pad is smooth, the surface is not slippery, which aids in retaining the pad on garments or the skin of a human; it tends to cling thereto.

FIGURES 1 and 2 show a hand pad 28 which covers the lower third of the arm, the wrist, back of the hand and knuckles, and provides excellent protection for linemen playing football. This pad, along with the others, is generally semi-circular in cross section and has a convex side, a concave side which is worn next to the body.

The means for securing the arm pad 28 to the body include elastic knit straps 30 and 32 which are secured to opposed sides of the pad and smaller criss-cross straps 34 which are also secured to opposed sides. The thumb 36 in FIGURE 2 may be positioned between the criss-cross member at 38 instead of to one side as shown to provide for a better grasp. The pad has recesses 40 formed to accommodate the knuckles as shown in the knuckle pad 42 of FIGURE 4a. The pad 28 has scalloped edges 29 over the knuckles as shown in FIGURE 1.

FIGURES 2 and 3 show the various pads secured to the pertaining limbs of the body.

FIGURE 4a shows a knuckle pad 42 which also protects the back of the hand. The pad has a generally semi-circular shape in cross section and has the elastic straps 44 secured to the convex side and are in criss-cross relation to each other as shown. The thumb 46 shown in dashed outline is positioned between the criss-cross straps as shown to provide for freedom of grasp.

FIGURE 20 shows a perspective view of a forearm pad 48 showing the side which is worn against the arm, the opposite side of the pad being shown in FIGURE 1. The means of securing the pad to the arm consists of elastic straps 30 and 32 along with straps 38 which are similar to the straps shown in FIGURE 2. The concave side of pad 48 contains the wrinkles 50 which provide some trapped air spaces, which tend to make the pad more comfortable in use.

The pads according to this invention are premolded to fit and the outer skin and the foam structure are made at one time to give a complete bond therebetween. The skin will not crack, peel loose, or break down, nor will it tear upon the removal of tape used to secure the pad to the body.

The skin can be a relatively soft skin or it can be made to be relatively stiff, depending upon the use of the pad.

Method of making pads

FIGURE 5 shows the mold 52 which has a suitable cavity shape for the pad to be produced. The mold is constructed of a suitable ceramic to withstand the temperatures used with the surface of the mold being smooth to provide a smooth surface for the pad shaped therein.

The materials used for the pads are plastisols which are dispersions of polyvinyl chloride resins in suitable liquid plasticizers for instance, phthalate, which normally are used to form solid plastic toys, for example. A suitable blowing agent is added to form the plastisol solids into an extremely tough foam which will absorb a very high degree of shock and which will readily lend itself to contour molding or shaping. The plastisol foam is chemically resistant to most acids, alkalies, detergents, oils, and some solvents. The amount of blowing agent used will be varied to give the size and number of cells desired in the foam.

Figure 6:
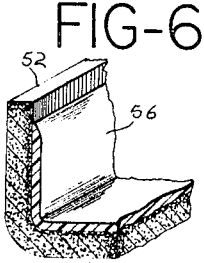
FIGURE 6 is a cross section of FIGURE 5 taken along the lines 6—6 thereof.

In preparing the pad, a suitable nozzle means 54 connected to a supply source of plastisol is used to spray a thin layer 56 of plastisol on the bottom and sides of the mold as shown in FIGURES 5 and 6. The height of the skin along the sides of the mold is determined by the thickness of the pad to be made. Generally the thickness of the skin is approximately 1/32 inch or less, depending upon the size of the pad.

Figure 7:
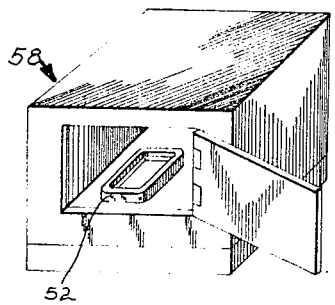
FIGURE 7 shows a perspective view of the mold with the skin in an oven.

After the above plastisol skin without blowing agent is sprayed on the mold, the mold and the skin are placed in an oven 58 as shown in FIGURE 7. The oven is maintained at a temperature of 375° F. and the mold skin thereon are placed therein for about 5 minutes and are then removed therefrom and cooled at room temperature.

Figure 8:
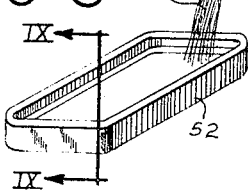
FIGURE 8 shows a perspective view of the plastisol with the blowing agent therein being poured into the mold with the heat cured skin thereon.
Figure 9:
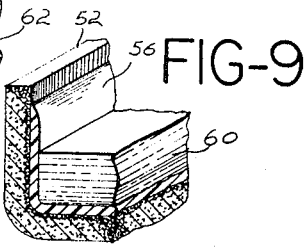
FIGURE 9 is a perspective view of FIGURE 8 taken along lines 9—9 thereof prior to expansion of the plastisol which will become the main cushioning member of the pad.
Figure 10:
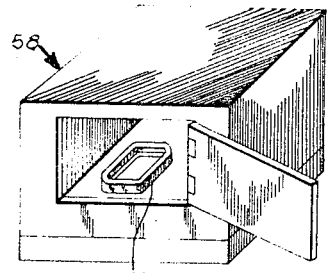
FIGURE 10 is a perspective view of the oven in which the elements shown in FIGURES 8 and 9 are heated.
Figure 11:
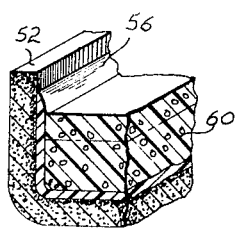
FIGURE 11 shows how the plastisol is expanded after heating.

After cooling a designated amount of cushioning material 60 (plastisol with a blowing agent) are poured from a container 62 into the mold as shown in FIGURES 8 and 9. The mold with the contents therein is then placed in the oven 58 at a temperature of 375° F. for approximately 5 minutes to jell the cushioning material and partially fuse the skin to the cushioning member.

Figure 12:
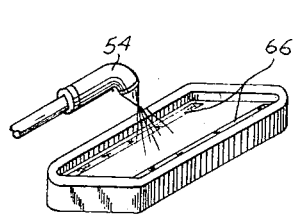
FIGURE 12 shows reinforcing strips in position on top of the expanded plastisol and the spraying of the top skin of plastisol.
Figure 13:
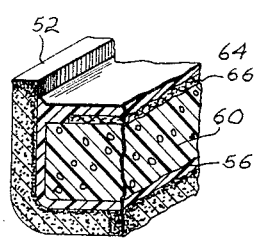
FIGURE 13 shows a partial cross section of the elements in the mold prior to heating.

The mold is then removed from the oven and the top of the plastisol with blowing agent is immediately sprayed with a layer of plastisol skin 64, without a blowing agent therein, to form the upper skin, as shown in FIGURES 12 and 13. For those pads which are to be reinforced, suitable flexible textile reinforcing strips 66, or their equivalents, are positioned on top of the plastisol cushion layer 60 and the skin 64 is sprayed thereover, as shown in FIGURES 12 and 13.

The mold and contents are then immediately placed in an oven 58 at approximately 375° F. for about 16–23 minutes to complete the fusing of the skin to the cushion member 60 and to complete the blowing of the member 60.

The mold 52 is then removed from the oven and the completed pad 68 is removed therefrom by simply lifting it out.

It should be noted that the pad 68 is not made and then dipped to have the skins formed on the cushion member. The entire pad is constructed at one time and is made from the same plastisol.

As removed from the mold, the pad 68 is generally planar in form and may be used as such with suitable means for securing the pad to the body; however, the pad performs better when it is molded to fit the contour of the body. The contour molding may be accomplished as follows:

A suitable shape 70, such as the one shown in FIGURE 17, may be used to form the contour of the pad. The pad 68 as taken from the mold may be placed on a tray and placed in an oven, such as 58, which has a temperature of 300° F., and the pad may be heated therein for about 7 minutes to rewarm the pad. After the pad is warmed, the pad is placed around the mold as shown in FIGURE 17 and a suitable power knit elastic fabric 72, similar to that used in ladies girdles, is placed on the pad and tensioned to firmly hold the pad against the form until it is cooled. Suitable clips 74 hold the elastic fabric taut until the shape of the pad is set upon cooling.

After cooling, the pad is removed from the form and it will retain its shape. Of course, the specific shape of the mold shape 70 will be dependent upon the intended use and may take the form of knee joint, hand and wrist, shoulder, etc. The straps may be then stitched on the pads as shown.

FIGURE 19 shows another means for contour molding the pad. It includes a mold 76 form which has a plurality of apertures 77 therein, which communicate with the interior of the mold and are connected by suitable conduit means 78 to a source of vacuum 80 which is powered by a suitable motor 82. The other end of the mold has a valve 84 in a conduit 86 which is connected to the interior of the mold.

After the pad 68 is placed on the mold, the vacuum generated at 80 will secure the pad there-against, and after cooling, the valve 84 may be opened to connect the interior of the mold to the atmosphere and thereby release the pad from the mold.

In the contour molding process, the concave side of the pad has a plurality of wrinkles 50 therein as shown in FIGURE 20.

Pad 48 shown in FIGURE 20 has suitable elastic means for securing the pad to the arm. The ends of the straps are sewn to the pad through the reinforcing means in the pad.

While the method of producing the pad has been shown relating to the production of one pad, it is understood that the process herein disclosed may be readily adapted to a continuous process in which the mold 52 may be passed along a conveyor which travels under a plurality of stations, for the spraying, heating, cooling, filling, heating and cooling operations mentioned. Instead of spraying the plastisol, other application means such as by brush may be used.

FIGURE 21 shows an endless type conveyor 88 which may be used for forming the pad of this invention in a continuous type process. The mold 52 is placed on the conveyor as shown with several molds placed on a generally wide conveyor. The nozzle means 55 on a flexible conduit may be used to spray the plastisol skin in the various molds.

The molds are then routed through an oven 90 having flap type doors 92 on the entrance and exit sides. The speed of the conveyor and length of the oven 90 are arranged to obtain the heating times mentioned earlier.

After the heating, suitable air blast nozzles 94 discharging cool air may be used to cool the molds to room temperature. The molds and cooled skins therein then pass under a hopper 96 having a throttle valve 98 therein for discharging the plastisol with blowing agent into the mold.

The mold and contents therein are then routed through a second oven 100 whose length is correlated to the conveyor speed to obtain the necessary time in the oven mentioned earlier.

After coming out of the oven 100, the reinforcing means are positioned on top of the partially blown plastisol and a plastisol skin is sprayed thereover by nozzle means 102.

The mold then enters the final oven 104 where the complete fusing and blowing takes place. After coming out of the oven, the pad may be removed from the mold. Operators may be positioned at the various stations along the conveyor to control the discharging of the plastisol and the application of the reinforcing means where necessary.

What is claimed is:

1. The method of making a resilient pad member having a fluid impervious skin thereon and especially adapted for use as a protective athletic pad, said method comprising; spraying a thin first layer of plastisol on the surface of a concave mold cavity to form first skin, heating said mold and said first skin to gel the skin to a non-flowable condition without completely curing the skin; cooling the mold and the said skin, placing a measured quantity of a mixture of the same plastisol and a blowing agent in the mold cavity so as to be supported and confined by said first skin to form a second layer in said mold, again heating the mold and the layers therein to gel said second layer to a non-flowable condition without completely curing said second layer, positioning flexible reinforcing strips on said second layer while the second layer is still warm and spraying a thin third layer of the same plastisol without a blowing agent therein over said second layer and strips and with said second layer at its edge engaging the edge of said first layer thereby to form a second skin, and again heating the mold to complete the blowing of said second layer and completely to gel and cure said skins and to fuse said skins together and to said second layer to complete said pad.

2. The method of making a protective athletic pad for protecting the body comprising; spraying a thin first layer of plastisol on a mold to form a first skin; heating the mold in an oven at approximately 375° F. for about 5 minutes and then cooling the same; placing a measured quantity of a mixture of the same plastisol with a blowing agent therein on top of said first skin to form a second layer in the mold; heating the mold in an oven at approximately 375° F. for about 5 minutes; removing the mold from the oven; immediately positioning flexible reinforcing strips on said second layer and spraying a thin third layer of the same plastisol over said second layer and strips to form a second skin; heating the mold in an oven at approximately 375° F. for about 16–23 minutes to complete the blowing of said second layer and to gel said skins and to fuse said skins to said second layer to complete the pad.

3. The method of forming a pad as claimed in claim 2 further comprising; positioning and securing the pad while warm around a form to form a contoured pad of a desired shape; cooling said pad while secured to the form to set the shape of the pad; removing the contoured pad from the form sewing knit elastic straps to said pad through said reinforcing means to provide the means for securing the pad to the body of the wearer, at least some of said straps being sewn on the pad in criss-cross relation to each other.

References Cited

UNITED STATES PATENTS

| 2,759,475 | 8/1956 | Van Swaay | 264—321 X |
| 2,828,798 | 4/1958 | Hopkins et al. | 156—305 X |
| 2,868,193 | 1/1959 | Kreft | 128—89 |
| 2,962,738 | 12/1960 | Andrade et al. | |
| 2,974,373 | 3/1961 | Streed et al. | 264—45 |
| 3,146,461 | 9/1964 | Kavanagh | 2—2 |

FOREIGN PATENTS

| 927,851 | 5/1955 | Germany. |
| 1,011,798 | 6/1952 | France. |

OTHER REFERENCES

Plastics World "Orthopedic Splints; porous plastics material allows the skin to breathe," vol. 19, No. 9, September 1961, page 52.

PHILIP E. ANDERSON, Primary Examiner.

U.S. Cl. X.R.

2—2; 264—54, 257, 309, 321